(12) United States Patent
Kim et al.

(10) Patent No.: US 10,167,858 B2
(45) Date of Patent: Jan. 1, 2019

(54) DOUBLE-HEADED SWASH TYPE COMPRESSOR AND METHOD FOR MANUFACTURING CYLINDER BLOCK

(71) Applicant: Hanon Systems, Daejeon (KR)

(72) Inventors: Min Gyu Kim, Daejeon (KR); Seung Yong Hwang, Daejeon (KR); Sang Ho Kim, Daejeon (KR); Duck Bin Yoon, Daejeon (KR)

(73) Assignee: HANON SYSTEMS, Daejeon (KR)

( * ) Notice: Subject to any disclaimer, the term of this patent is extended or adjusted under 35 U.S.C. 154(b) by 0 days.

(21) Appl. No.: 15/026,631

(22) PCT Filed: May 22, 2015

(86) PCT No.: PCT/KR2015/005216
§ 371 (c)(1),
(2) Date: Apr. 1, 2016

(87) PCT Pub. No.: WO2016/171309
PCT Pub. Date: Oct. 27, 2016

(65) Prior Publication Data
US 2018/0030970 A1 Feb. 1, 2018

(30) Foreign Application Priority Data
Apr. 24, 2015 (KR) .................. 10-2015-0058196

(51) Int. Cl.
*F04B 27/08* (2006.01)
*F04B 39/00* (2006.01)
(Continued)

(52) U.S. Cl.
CPC ............ *F04B 27/083* (2013.01); *F04B 27/08* (2013.01); *F04B 27/0891* (2013.01); *F04B 27/0895* (2013.01); *F04B 27/10* (2013.01); *F04B 27/1063* (2013.01); *F04B 27/12* (2013.01); *F04B 39/00* (2013.01); *F04B 39/12* (2013.01); *F04B 53/00* (2013.01); *F16C 33/1095* (2013.01); *F16C 33/121* (2013.01);
(Continued)

(58) Field of Classification Search
CPC ................ F04B 1/2085; F04B 27/0808; F04B 27/0834; F04B 27/086; F04B 27/10; F04B 27/109
USPC ...................................................... 417/222.2
See application file for complete search history.

(56) References Cited

U.S. PATENT DOCUMENTS 5,087,181 A * 2/1992 Kamitsuma ............... C23C 8/28
148/217
5,253,576 A 10/1993 Bethke
(Continued)

FOREIGN PATENT DOCUMENTS

CN 1432734 A 7/2003
DE 2316915 A1 10/1973
(Continued)

*Primary Examiner* — Patrick Hamo
(74) *Attorney, Agent, or Firm* — Shumaker, Loop & Kendrick, LLP; James D. Miller

(57) ABSTRACT

Disclosed herein is a double-headed swash type compressor, and a distance between an outer peripheral surface of a shaft (20) and an inner peripheral surface of a shaft bore (11) is greater than a distance between the outer peripheral surface of the shaft (20) and an inner peripheral surface of a journal bearing (30).

20 Claims, 12 Drawing Sheets

(51) Int. Cl.
  *F04B 53/00*    (2006.01)
  *F04B 27/10*    (2006.01)
  *F04B 27/12*    (2006.01)
  *F04B 39/12*    (2006.01)
  *F16C 33/10*    (2006.01)
  *F16C 33/12*    (2006.01)
  *F16C 33/16*    (2006.01)
  *F16C 37/00*    (2006.01)

(52) U.S. Cl.
  CPC ............ *F16C 33/128* (2013.01); *F16C 33/16* (2013.01); *F04B 53/007* (2013.01); *F16C 37/00* (2013.01); *F16C 2202/50* (2013.01); *F16C 2202/52* (2013.01); *F16C 2204/10* (2013.01); *F16C 2204/30* (2013.01); *F16C 2208/32* (2013.01)

(56) References Cited

U.S. PATENT DOCUMENTS

| | | | | |
|---|---|---|---|---|
| 5,864,745 | A * | 1/1999 | Kawagoe | C23C 4/02 427/455 |
| 6,988,875 | B2 * | 1/2006 | Shintoku | F04B 27/109 184/6.17 |
| 2002/0176785 | A1 * | 11/2002 | Suitou | F04B 27/1063 417/222.2 |
| 2003/0108436 | A1 | 6/2003 | Shintoku et al. | |
| 2003/0175129 | A1 * | 9/2003 | Iizuka | F04B 27/1045 417/269 |
| 2004/0091732 | A1 | 5/2004 | Sato et al. | |
| 2005/0129341 | A1 * | 6/2005 | Hoppe | F04B 1/2071 384/462 |
| 2012/0237369 | A1 | 9/2012 | Kobayashi et al. | |

FOREIGN PATENT DOCUMENTS

| | | |
|---|---|---|
| DE | 10260327 A1 | 7/2003 |
| DE | 10260328 A1 | 10/2003 |
| JP | 53038243 A | 4/1978 |
| JP | H06192783 A | 7/1994 |
| JP | H079046 B2 | 2/1995 |
| JP | 2003247488 A | 9/2003 |
| JP | WO2007080824 A1 | 6/2009 |
| JP | 20122246831 A | 12/2012 |
| JP | 2013-145026 A | 7/2013 |
| JP | 2013145026 A | 7/2013 |
| KR | 20030054363 A | 7/2003 |
| KR | 100554553 B1 | 3/2006 |
| KR | 20140065466 A | 5/2014 |
| WO | 2012153474 A1 | 11/2012 |
| WO | 2014156856 A1 | 10/2014 |

* cited by examiner

DOUBLE-HEADED SWASH TYPE COMPRESSOR AND METHOD FOR MANUFACTURING CYLINDER BLOCK

CROSS-REFERENCE TO RELATED APPLICATIONS

This patent application is a United States national phase patent application based on PCT/KR2015/005216 filed May 22, 2015 which claims the benefit of Korean Patent Application No. 10-2015-0058196 filed Apr. 24, 2015. The entire disclosures of the above patent applications are hereby incorporated herein by reference.

TECHNICAL FIELD

The present invention relates to a double-headed swash type compressor and a method for manufacturing a cylinder block, and more particularly, to a method for manufacturing a cylinder block and a journal bearing coming into contact with a shaft.

BACKGROUND ART

A vehicle air conditioning system is a system which maintains the temperature inside a vehicle at a lower temperature than the external temperature using refrigerant. The vehicle air conditioning system includes a compressor, a condenser, and an evaporator in order to form a refrigerant circulation cycle. The compressor is a device which compresses and transfers refrigerant, and is operated by the power of an engine or the driving of a motor.

In a double-headed swash type compressor which is a type of reciprocating compressor, a disk-shaped swash plate is installed to a shaft to which the power of an engine is transferred. A plurality of pistons is installed around the swash plate with a shoe interposed therebetween. When the swash plate rotates, the pistons reciprocate in respective cylinder bores formed in a cylinder block, thereby allowing refrigerant to be introduced, compressed, and discharged. In this case, a valve plate to control the introduction and discharge of the refrigerant is installed between a housing and the cylinder block.

In a conventional double-headed swash type compressor, a sliding bearing is installed between a shaft and a shaft bore in order to reduce wear and friction due to the rotation of the shaft. However, the sliding bearing is made of a metal material coated with fluorine resin, and therefore, when a hole for movement of refrigerant is processed in the sliding bearing, the accuracy of the hole may be deteriorated and burrs may be generated due to the high elongation of the sliding bearing.

In addition, in the initial stage where the double-headed swash type compressor is driven, the antiwear between the shaft and the sliding bearing is not stably performed, which may lead to an increase in friction due to the wear therebetween and thus leakage of refrigerant when the compressor is used for a long time.

SUMMARY OF THE INVENTION

Accordingly, the present invention has been made in view of the above-mentioned problem, and an object thereof is to provide a double-headed swash type compressor and a method for manufacturing a cylinder block, in which a journal bearing coming into contact with a shaft of the double-headed swash type compressor is made of a sintered alloy and is formed with a pore such that oil contained in refrigerant is introduced and discharged through the pore.

Technical Solution

In accordance with an aspect of the present invention, a double-headed swash type compressor includes a cylinder block including a plurality of piston bores radially disposed, pistons reciprocating in the piston bores, and a shaft bore disposed between the piston bores, the shaft bore being formed with a plurality of refrigerant supply holes communicating with compression chambers defined by the respective piston bores and pistons, front and rear housings coupled to respective front and rear sides of the cylinder block so as to define discharge chambers, a shaft inserted into the shaft bore, and having a passage formed such that refrigerant moves therein, a refrigerant introduction hole communicating with a suction space in the cylinder block to introduce refrigerant in the suction space therethrough, and refrigerant discharge holes through which the refrigerant introduced through the refrigerant introduction hole is discharged, a swash plate obliquely installed to the shaft and connected to the pistons, and a journal bearing disposed between an inner wall of the shaft bore and the shaft and made of a porous material, wherein a distance between an outer peripheral surface of the shaft and an inner peripheral surface of the shaft bore is greater than a distance between the outer peripheral surface of the shaft and an inner peripheral surface of the journal bearing.

The cylinder block may include a groove portion formed so as to be relatively longer than a length of the journal bearing, for insertion of the journal bearing.

The groove portion may be formed with a step disposed so as to face one surface of the journal bearing and be spaced apart therefrom.

The journal bearing may have through-holes formed to be aligned with refrigerant supply holes, and each of the through-holes and the refrigerant supply holes may be obliquely disposed to the shaft bore in a longitudinal direction thereof.

The shaft may further include a coating layer formed on the outer peripheral surface thereof facing the inner peripheral surface of the journal bearing.

The journal bearing may have an air porosity of 5 to 20% of overall volume thereof.

The journal bearing may have an air porosity of 7% of overall volume thereof.

The journal bearing may be made of a sintered material.

The sintered material may include copper, tin, and graphite.

The journal bearing may include a solid lubricant.

The solid lubricant may selectively use one of graphite, mica, talc, boric acid, zinc oxide, plumbic oxide, sulfur, molybden disulphide, polytetrafluoroethylene (PTFE), and hexagonal boric acid (hBN), or a combination thereof.

In the cylinder block, the outer peripheral surface of the shaft may be spaced apart from the inner peripheral surface of the shaft bore by a first distance (a) in a state in which the shaft is inserted into the shaft bore, and oil contained in refrigerant may be introduced into or stored in the first distance (a) so that an oil film is formed on the shaft.

The journal bearing may be inserted into the shaft bore so as to be spaced apart from an inner end of the shaft bore by a second distance (b), and oil contained in refrigerant may be introduced into or stored in the second distance (b) so that an oil film is formed on the shaft.

The shaft may have a coating layer (21) formed on the outer peripheral surface thereof, and the coating layer may be a polytetrafluoroethylene (PTFE) coating layer.

The journal bearing may be made of a material composed of 89% copper, 10% tin, and 1% graphite.

The journal bearing may be made of a material composed of 87% copper, 10% tin, and 3% graphite.

In accordance with another aspect of the present invention, a double-headed swash type compressor includes a cylinder block including a plurality of piston bores radially disposed, pistons reciprocating in the piston bores, and a cylindrical shaft bore disposed between the piston bores, front and rear housings coupled to respective front and rear sides of the cylinder block so as to define discharge chambers, a shaft having a passage formed therein so as to communicate with a suction space disposed between the discharge chambers, so that refrigerant introduced into the suction space is transferred to the piston bores, a swash plate obliquely installed to the shaft and connected to the pistons, and a journal bearing disposed between an inner wall of the shaft bore and the shaft and made of a sintered material, wherein a space portion (S) is defined between an outer peripheral surface of the shaft and an inner peripheral surface of the shaft bore, and the space portion (S) communicates with the suction space.

The cylinder block may include a groove portion formed so as to be relatively longer than a length of the journal bearing, for insertion of the journal bearing, and the space portion (S) may extend to the groove portion.

The groove portion may be formed with a step disposed so as to face one surface of the journal bearing and be spaced apart therefrom, and a fluid introduced into the space portion may flow to the journal bearing via the step.

The sintered material may include copper, tin, and graphite.

In accordance with another aspect of the present invention, a double-headed swash type compressor includes a cylinder block including a plurality of piston bores radially disposed, pistons reciprocating in the piston bores, and a cylindrical shaft bore disposed between the piston bores, front and rear housings coupled to respective front and rear sides of the cylinder block so as to define discharge chambers, a shaft having a passage formed therein so as to communicate with a suction space disposed between the discharge chambers, so that refrigerant introduced into the suction space is transferred to the piston bores, a swash plate obliquely installed to the shaft and connected to the pistons, and a journal bearing disposed between an inner wall of the shaft bore and the shaft, made of a material composed of 89% copper, 10% tin, and 1% graphite, and having an air porosity of 7% of overall volume thereof.

Alternatively, refrigerant may be moved when positions of the refrigerant discharge holes coincide with positions of the through-holes formed in the journal bearing during rotation of the shaft.

In accordance with a further aspect of the present invention, a method for manufacturing a cylinder block includes preparing a cylinder block (ST100) including a plurality of piston bores radially disposed, pistons reciprocating in the piston bores, and a cylindrical shaft bore disposed between the piston bores, inserting a journal bearing made of a sintered material into each of both ends of the shaft bore (ST200), and processing holes (ST300) so as to form through-holes in the journal bearing in a state in which the journal bearing is inserted into the shaft bore while the shaft bore communicates with the piston bores in the cylinder block.

The processing holes (ST300) may include moving forward a hole processing tool in a direction inclined to a longitudinal direction of the shaft bore (ST310).

In the processing holes (ST300), the holes may be process at an angle of inclination of 70 degrees or 65 to 75 degrees.

The method may further include impregnating the cylinder block (ST400) with respect to the journal bearing.

The impregnating the cylinder block (ST400) may include immersing the cylinder block in liquid resin and then taking out the same (ST410).

The preparing a cylinder block (ST100) may include processing the shaft bore so as to have a first processing length in an inward longitudinal direction thereof (ST110).

The preparing a cylinder block (ST100) may include processing the shaft bore such that a first inner diameter tolerance is maintained between an outer diameter of the journal bearing and an inner diameter of the shaft bore (ST120).

The journal bearing may be made of a material composed of 89% copper, 10% tin, and 1% graphite, and have an air porosity of 7% of overall volume thereof.

Advantageous Effects

In accordance with the present invention, it is possible to realize stable lubrication of a journal bearing coming into close contact with a shaft of a double-headed swash type compressor and reduce generation of wear therein. Thus, the double-headed swash type compressor can be stably operated even when it is used for a long time.

In the double-headed swash type compressor, the journal bearing is made of a sintered alloy and is formed with a pore such that oil contained in refrigerant is introduced and discharged through the pore. Therefore, the journal bearing can be stably lubricated in an unlubricated condition.

The accuracy of the journal bearing can be improved even when a hole for movement of refrigerant is processed in the journal bearing. Therefore, it is possible to simultaneously improve productivity and economic efficiency through an improvement in workability and a reduction in defect rate by an operator.

Additional advantages, objects, and features of the invention will be set forth in part in the description which follows and in part will become apparent to those having ordinary skill in the art upon examination of the following or may be learned from practice of the invention.

BRIEF DESCRIPTION OF DRAWINGS

The above and other objects, features and other advantages of the present invention will be more clearly understood from the following detailed description taken in conjunction with the accompanying drawings, in which.

DETAILED DESCRIPTION OF EXEMPLARY EMBODIMENTS OF THE INVENTION

Figure 1:
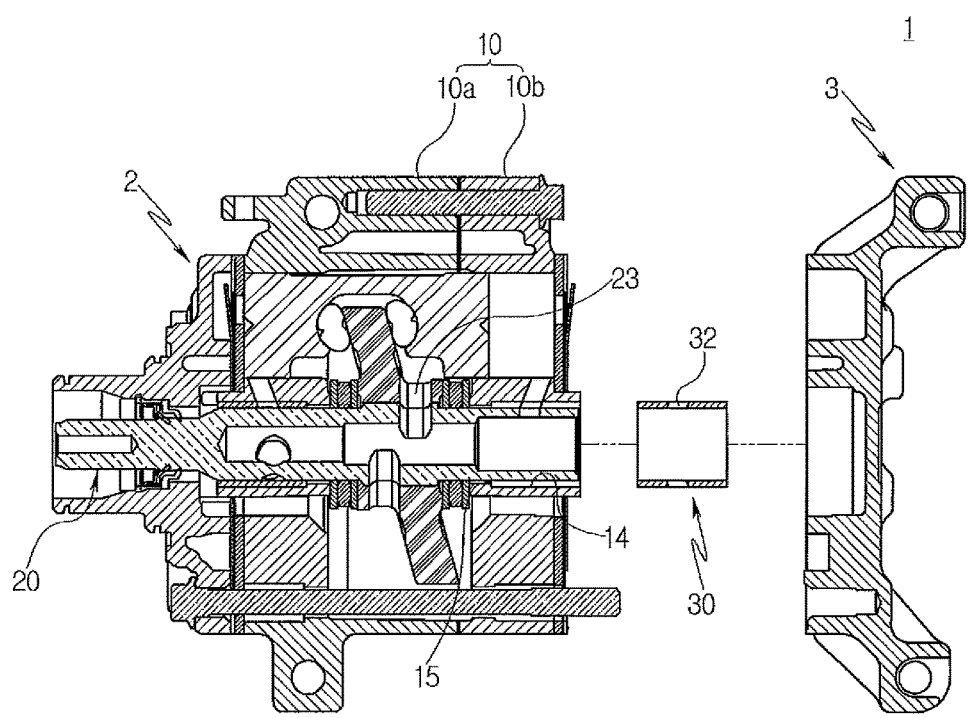
FIG. 1 is a partially exploded cross-sectional view illustrating a double-headed swash type compressor according to a first embodiment of the present invention.
Figure 2:
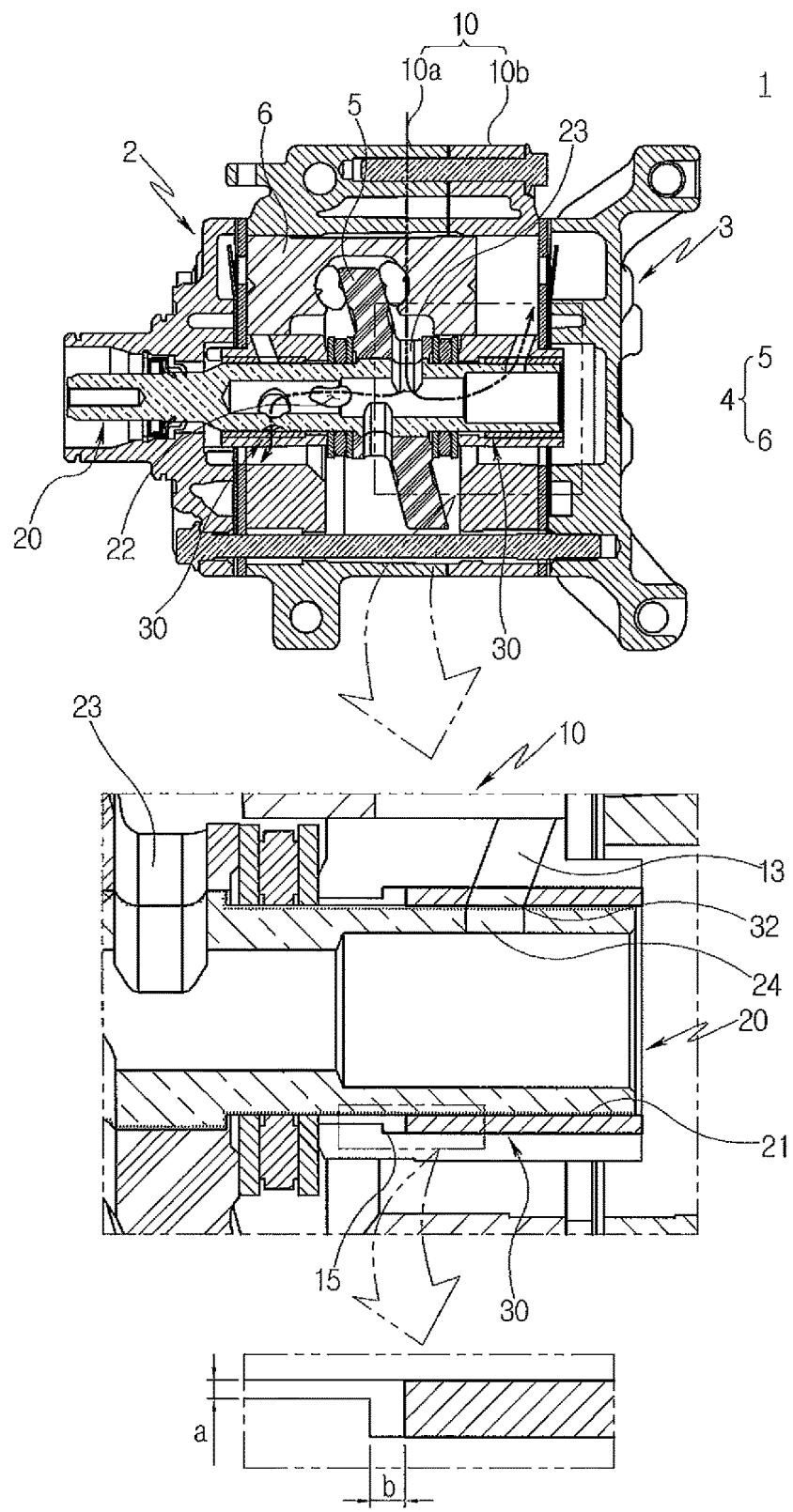
FIG. 2 is an assembled cross-sectional view illustrating the double-headed swash type compressor according to the first embodiment of the present invention.
Figure 3:
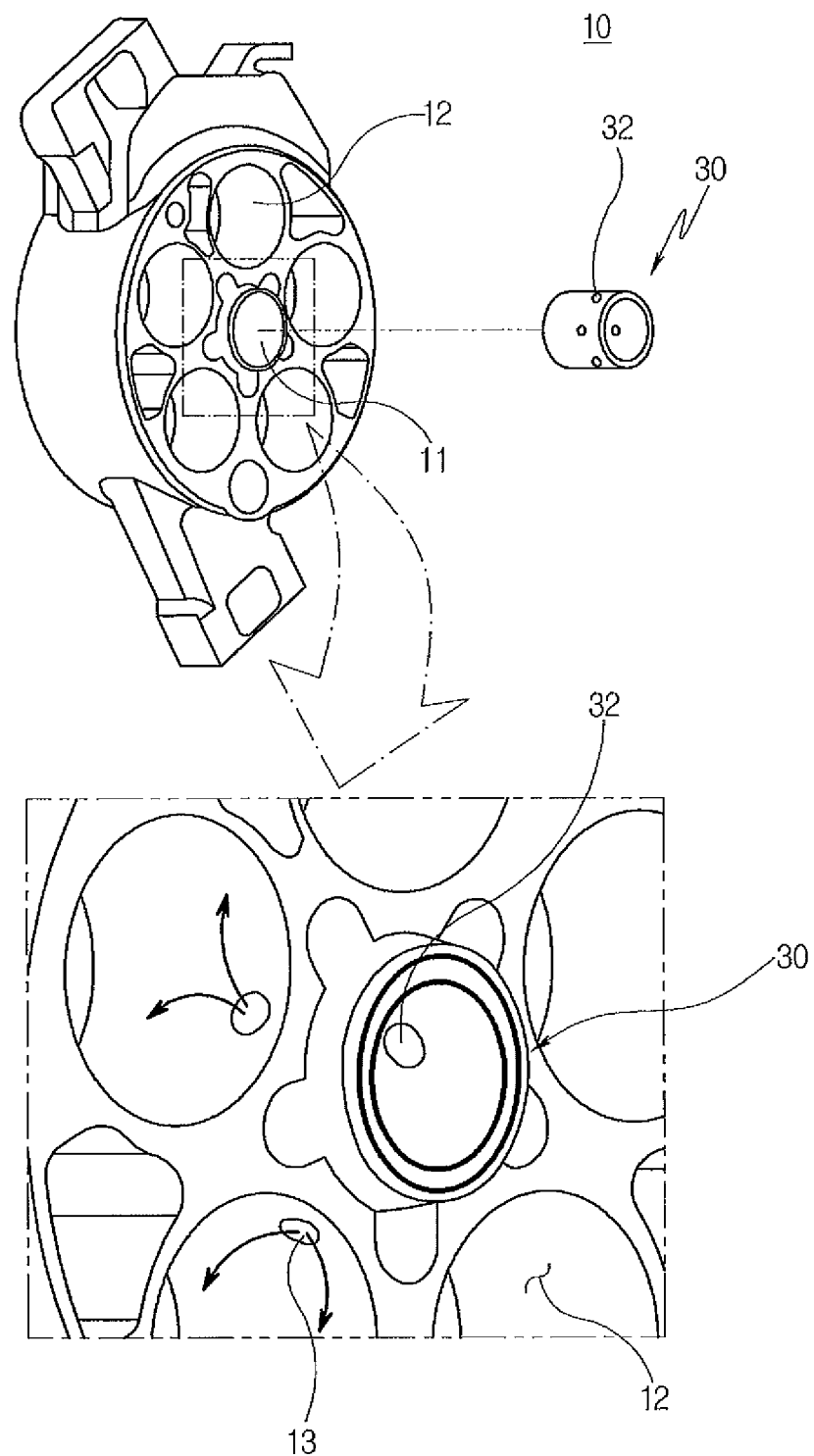
FIG. 3 is an exploded perspective view illustrating a state in which a journal bearing is inserted into a cylinder block, according to the first embodiment of the present invention.
Figure 4A:
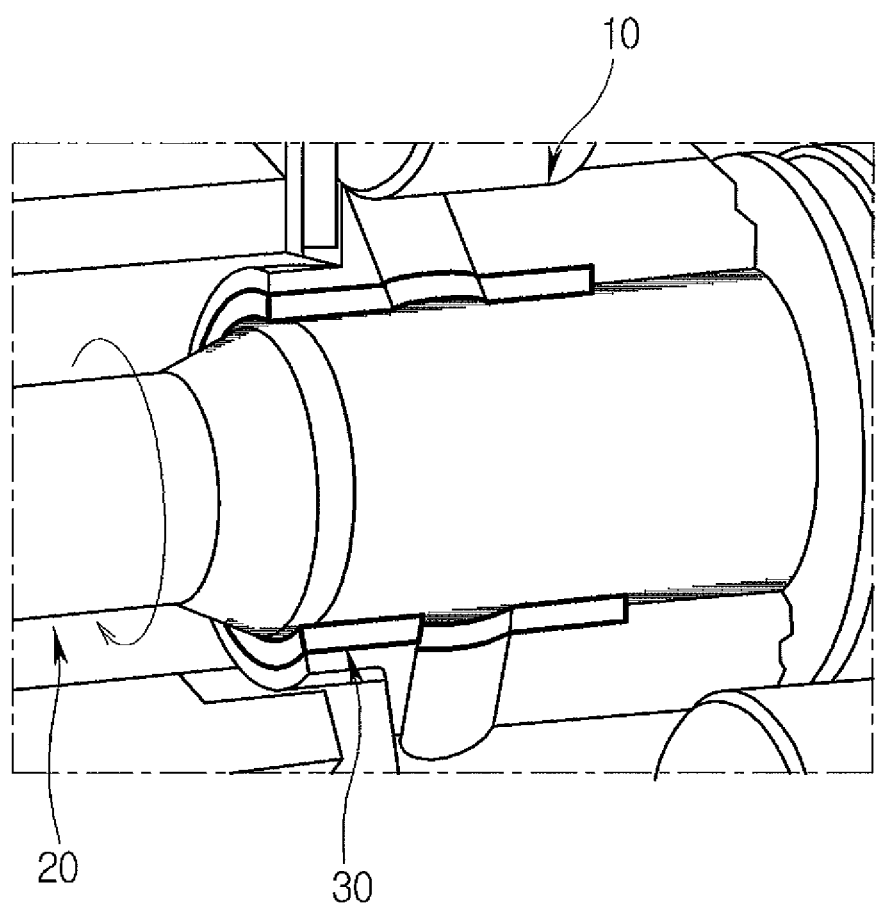
FIG. 4A is an enlarged fragmentary perspective view illustrating a state of operation of the journal bearing and a shaft when the double-headed swash type compressor is initially operated in an unlubricated state, according to the first embodiment of the present invention.

Reference will now be made in detail to a double-headed swash type compressor according to a first embodiment of the present invention, examples of which are illustrated in the accompanying drawings. FIG. 1 is an exploded cross-sectional view illustrating a double-headed swash type compressor 1 according to a first embodiment of the present invention. FIG. 2 is an assembled perspective view illustrating the double-headed swash type compressor 1 according to the first embodiment of the present invention. FIG. 3 is a perspective view illustrating a state in which a journal bearing 30 is inserted into a cylinder block 10, according to the first embodiment of the present invention. FIG. 4A is a perspective view illustrating a state of operation of the journal bearing 30 and a shaft 20 when the double-headed swash type compressor 1 is initially operated in an unlubricated state, according to the first embodiment of the present invention.

Referring to FIGS. 1 to 3, the double-headed swash type compressor, which is designated by reference numeral 1, includes the cylinder block 10 having a plurality of piston bores 12, or cylinders, formed around a shaft bore 11, front and rear housings 2 and 3 which are respectively coupled to the front and rear of the cylinder block 10, the shaft 20 installed through the front housing 2 and the cylinder block 10, and a compression unit 4 which compresses a working fluid in the cylinder block 10 depending on the rotation of the shaft 20.

The cylinder block 10 includes a front cylinder block 10a and a rear cylinder block 10b which are coupled so as to face each other. The shaft 20 is installed via the shaft bore 11 at the inner center of the front and rear cylinder blocks 10a and 10b.

Specifically, the double-headed swash type compressor 1 includes the cylinder block 10, the front and the rear housings 2 and 3, the shaft 20, a swash plate 5, and the journal bearing 30. The cylinder block 10 includes the plurality of piston bores 12 which are radially disposed, pistons 6 which reciprocate in the piston bores 12, and the shaft bore 11 which is disposed between the piston bores 12, and the shaft bore 11 is formed with a plurality of refrigerant supply holes 13 which communicate with compression chambers defined by the respective piston bores 12 and the pistons 6. The front and the rear housings 2 and 3 are respectively coupled to the front and the rear of the cylinder block 10 so as to define discharge chambers. The shaft 20 is inserted into the shaft bore 11, and has a passage 22 formed such that refrigerant moves therein, a refrigerant introduction hole 23 communicating with the suction space in the cylinder block 10 to introduce refrigerant in the suction space therethrough, and refrigerant discharge holes 24 through which the refrigerant introduced through the refrigerant introduction hole 23 is discharged. The swash plate 5 is obliquely installed to the shaft 20 and is connected to the pistons 6. The journal bearing 30 is disposed between the inner wall of the shaft bore 11 and the shaft 20 and is made of a porous material. The distance between the outer peripheral surface of the shaft 20 and the inner peripheral surface of the shaft bore 11 is greater than the distance between the outer peripheral surface of the shaft 20 and the inner peripheral surface of the journal bearing 30.

In particular, the distance between the outer peripheral surface of the shaft 20 and the inner peripheral surface of the shaft bore 11 is greater than the distance between the outer peripheral surface of the shaft 20 and the inner peripheral surface of the journal bearing 30. This relationship is closely connected with the arrangement of the cylinder block 10 and the journal bearing 30. In the embodiment, the front and the rear ends of the shaft 20 in the longitudinal direction thereof are in close contact with the journal bearing 30, and the outer peripheral surface of the shaft 20 is spaced apart from the inner peripheral surface of the shaft bore 11 in the cylinder block 10 by a first distance (a).

On the other hand, since the outer peripheral surface of the shaft 20 is in close contact with the inner peripheral surface of the journal bearing 30, direct friction depending on the rotation of the shaft 20 is mainly generated between the shaft 20 and the journal bearing 30.

The piston bores 12 are circumferentially spaced at a certain interval around the shaft bore 11, as illustrated in the drawings.

In the cylinder block 10, the outer peripheral surface of the shaft 20 is spaced apart from the inner peripheral surface of the shaft bore 11 by the first distance (a) in the state in which the shaft 20 is inserted into the shaft bore 11. Accordingly, oil contained in refrigerant is introduced into or stored in the first distance (a), and thus an oil film is formed on the shaft 20. Therefore, when the shaft 20 rotates, friction due to the direct contact between the shaft 20 and the shaft bore 11 in the cylinder block 10 is reduced.

That is, the direct friction with the shaft 20 is generated only at a position, in which the journal bearing 30 is inserted into the shaft bore 11, when the shaft 20 is supported and rotated at the position. Therefore, the friction is generated only at a specific position in the overall length of the shaft 20, and is not generated in the overall section of the shaft 20.

The first distance (a) is not limited to a specific distance, but the first distance (a) may be set to be about 2 mm through a simulation so as to form a stable oil film.

The journal bearing 30 is inserted into the shaft bore 11 so as to be spaced apart from the inner end of the shaft bore 11 by a second distance (b), and oil contained in refrigerant is introduced into or stored in the second distance (b) so that an oil film is formed on the shaft 20. The second distance (b)

refers to a distance between a step 15 to be described later and one surface of the journal bearing 30.

Since the oil contained in refrigerant is introduced into and stored in the second distance (b), the oil film may be stably formed regardless of the rotation of the shaft 20, and the leakage of refrigerant caused along the outer peripheral surface of the shaft 20 may be prevented or reduced. Thus, when the double-headed swash type compressor 1 is used for a long time, the matters relating to the leakage of refrigerant and the direct wear of the shaft 20 can be reduced.

In addition, since one end of the journal bearing 30 does not come into direct contact with the step 15, the pressure generated by the insertion of the journal bearing 30 is not rapidly increased at a position adjacent to the step 15. Therefore, owing to the stable insertion of the journal bearing 30, the insertion stability of the journal bearing 30 can be improved and the damage and deformation of the journal bearing 30 can be reduced.

The second distance (b) is not necessarily limited to a distance illustrated in the drawings. The second distance (b) may not be formed so long as the journal bearing 30 is stably press-fitted into the shaft bore without the need of the second distance (b).

Since the first distance (a) communicates with the second distance (b), oil contained in refrigerant may freely move between the first and the second distances (a) and (b). Therefore, the lubrication in the cylinder block 10 and the lubrication between the shaft 20 and the journal bearing 30 can be stably realized.

The refrigerant introduction hole 23 is disposed at the center of the shaft 20 in the longitudinal direction thereof or at a position spaced from the center of the shaft 20 in the longitudinal direction thereof. In this case, refrigerant may move to left and right sides at the shortest distance on the basis of the drawing in the passage 22 formed in the shaft 20. Thus, since the movement distance of refrigerant is short and the structure of the cylinder block 10 is simplified, operation stability and processability can be improved.

The cylinder block 10 includes the refrigerant supply holes 13 which are obliquely opened toward the respective piston bores 12 from the shaft bore 11 in order to move refrigerant therethrough. Since the holes for movement of refrigerant are processed at one time from the piston bores 12 via through-holes 32 in the journal bearing 30 to the refrigerant supply holes 13 in the shaft bore 11, it is possible to improve workability by an operator, coincidence of opened holes, and process accuracy, and to reduce the generation of burrs. Therefore, the refrigerant supply holes 13 and the through-holes 32 may be processed at one time.

Each of the refrigerant supply holes 13 and the through-holes 32 is processed so as to be inclined toward the shaft 20 at a first angle of inclination. The first angle of inclination may be an angle of 70 degrees or an angle of about 65 to 75 degrees.

The cylinder block 10 has a groove portion 14 which is relatively longer than the length of the journal bearing 30 for the insertion of the journal bearing 30. The step 15 is formed at a position, which faces one surface of the journal bearing 30 and is spaced by a predetermined distance, in the groove portion 14. The journal bearing 30 is inserted into the groove portion 14 formed over the first and the second cylinder blocks 10a and 10b.

The groove portion 14 is formed for the insertion of the journal bearing 30, and the opened length of the groove portion 14 is relatively longer than the length of the journal bearing 30. For example, when the reference length of the groove portion 14 is "L", the groove portion 14 may further extend within a range of a tolerance of 1 to 2 mm or more. Therefore, the stable insertion of the journal bearing 30 can be performed.

Since the step 15 has a length that extends by the same length as the thickness of the journal bearing 30, the journal bearing 30 does not protrude toward the inner center of the shaft bore 11 in the state in which the journal bearing 30 is inserted thereinto. Therefore, it is possible to stably insert the shaft 20 and reduce friction due to the rotation thereof.

In the embodiment, the shaft 20 rotates relative to the inner peripheral surface of the journal bearing 30. In order to reduce friction and wear due to the rotation of the shaft 20 and reduce damage to the outer peripheral surface of the shaft 20, a coating layer 21 is formed on the shaft 20. The coating layer 21 may be formed on only the outer peripheral surface of the shaft 20 coming into contact with the inner peripheral surface of the journal bearing 30 or on the overall outer peripheral surface of the shaft 20, but the present invention is not limed thereto.

The coating layer 21 may be, for example, a polytetrafluoroethylene (PTFE) coating layer. The thickness of the coating layer 21 is not especially limited, but an optimal thickness is set through a simulation.

When the polytetrafluoroethylene (PTFE) coating layer 21 is formed on the shaft 20, the wear and damage of the journal bearing 30 due to the rotation of the shaft 20 can be reduced, and the durability thereof can be improved. Therefore, even when the double-headed swash type compressor is used for a long time, refrigerant can be stably compressed.

The journal bearing 30 is forcibly press-fitted toward the front of the groove portion 14 from the rear thereof. To this end, the press-fitting of the journal bearing 30 is performed using a separate press unit.

In order to reduce the friction between the journal bearing 30 and the shaft 20, the journal bearing 30 is made of a sintered alloy obtained by compression-molding metal powder having a specific composition ratio at high pressure of several tons or more, and then sintering the same at high temperature, instead of using a separate lubricant or a lubrication component. In the embodiment, the journal bearing 30 may be made of, for example, a material composed of 89% copper, 10% tin, and 1% graphite.

When the journal bearing 30 is made of the sintered alloy, the journal bearing 30 is manufactured by heating a material composed of copper, tin, and graphite at high temperature of the melting point thereof or more. Thus, the wear of the journal bearing 30 due to direct friction with the shaft 20 can be reduced and the tensile strength thereof can be improved. Therefore, even when the double-headed swash type compressor 1 is used for a long time, the structural safety and strength of the journal bearing 30 can be uniformly maintained.

When the above material is heated at a temperature of 700 to 800 degrees Celcius in order to manufacture the journal bearing 30, tin is first melted and thus pores are formed in copper. In this case, the journal bearing 30 may have an air porosity of at least 7% of the overall volume thereof.

The air porosity is a ratio of a vacant space to the overall volume of the journal bearing 30. The air porosity of at least 7% means that, when the overall volume of the journal bearing 30 is assumed to be 100%, the ratio of pore (vacant space) is at least 7%. The overall strength of the journal bearing 30 is changed according to air porosity. The more the air porosity is increased, the more the strength of the journal bearing 30 is decreased, and the more the air porosity is decreased, the more the strength of the journal bearing 30 is increased.

When the journal bearing 30 has the air porosity of a specific percentage, lubrication may be stably performed on the journal bearing 30 when the inner peripheral surface of the journal bearing 30 coming into direct contact with the shaft 20 is not lubricated in the initial stage where the double-headed swash type compressor 1 is operated in the stopped state.

The journal bearing 30 may be made of a material composed of 87% copper, 10% tin, and 3% graphite. The strength of the journal bearing 30 may be slightly changed according to the composition ratio of copper and graphite, but the same effect as that of the above-mentioned embodiment may be obtained.

As illustrated in the drawing, the shaft bore 11 into which the shaft 20 is inserted is formed at the center of the cylinder block 10, and the piston bores 12 are arranged around the shaft bore 11.

The cylinder block 10 includes the refrigerant supply holes 13 which are opened toward the respective piston bores 12 from the shaft bore 11 in order to move refrigerant therethrough. All of the refrigerant supply holes 13 have the same diameter and are opened toward the respective piston bores 12.

The refrigerant supply holes 13 are opened in the state in which they are spaced at equal intervals. Accordingly, refrigerant is uniformly supplied to the piston bores 12, which are located at different positions, according to the rotation of the shaft 20. Here, detailed description thereof will be given together with the description of the shaft 20.

Hereinafter, the lubrication relationship between the shaft 20 and the journal bearing 30 according to the present invention will be described in detail with reference to the drawings.

Referring to FIG. 4A, in the initial stage where electric power is applied to the double-headed swash type compressor 1 and the shaft 20 rotates at a specific rpm, the inner peripheral surface of the journal bearing 30 and the outer peripheral surface of the shaft 20 are maintained in an unlubricated state. However, lubrication is performed between the inner peripheral surface of the journal bearing 30 and the outer peripheral surface of the shaft 20 by the coating layer 21 formed on the outer peripheral surface of the shaft 20 in order to reduce the friction therebetween.

Figure 4B:
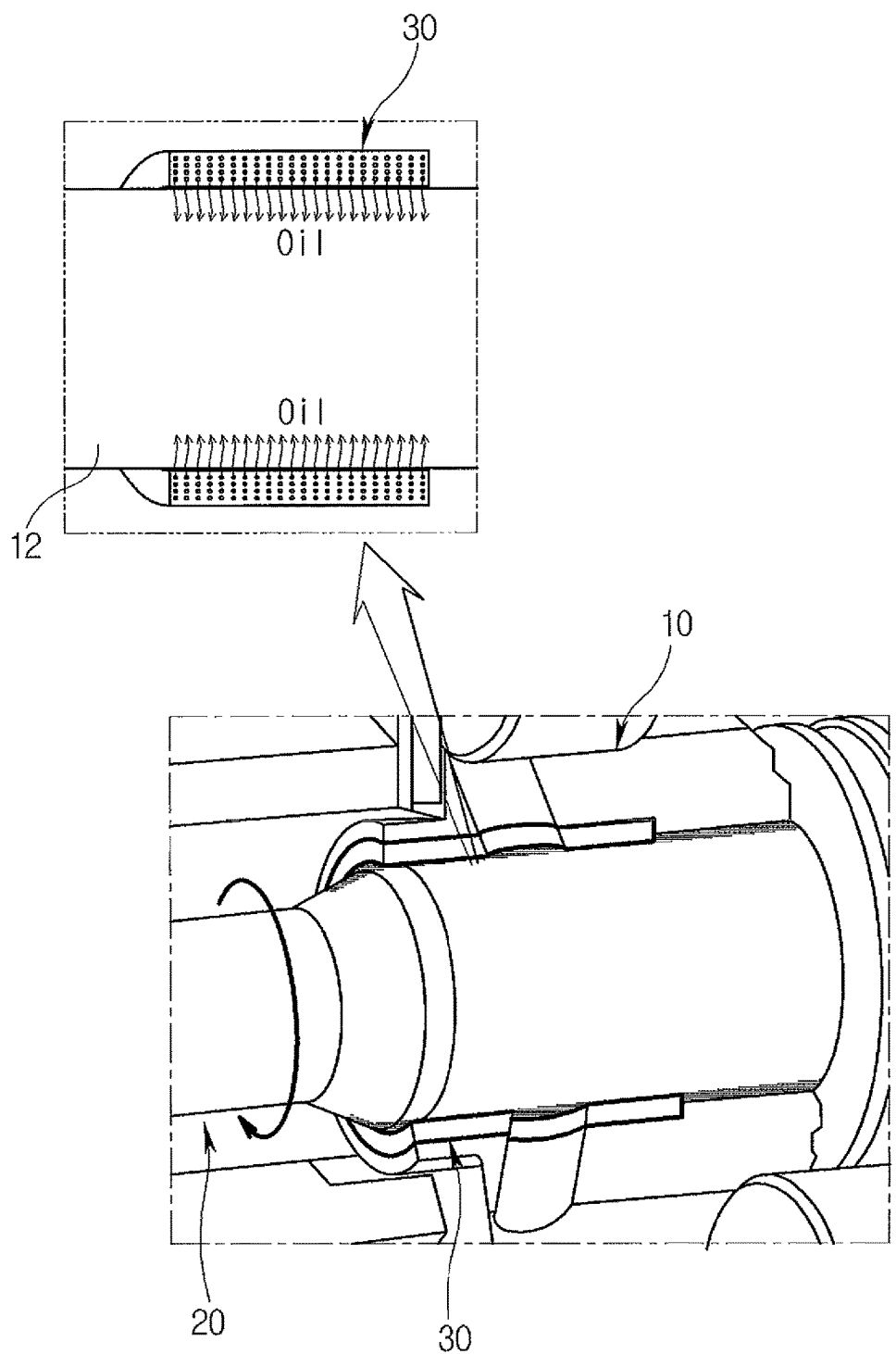
FIG. 4B is an enlarged fragmentary perspective view illustrating a state in which oil is discharged to the shaft through pores formed in the journal bearing, after the state of FIG. 4A.

Referring to FIG. 4B, when the shaft 20 rotates at a specific rpm after the lapse of time t1, frictional heat is generated due to the friction between the inner peripheral surface of the journal bearing 30 and the outer peripheral surface of the shaft 20, and thus the temperature of the contact portion therebetween is increased. As a result, oil contained in refrigerant, which is introduced into the pores formed in the journal bearing 30, flows out to the inner peripheral surface of the journal bearing 30.

In this case, since the oil film is formed between the inner peripheral surface of the journal bearing 30 and the shaft 20, the stable lubrication between the shaft 20 and the journal bearing 30 may be realized using oil contained in refrigerant without using a separate lubricant. Therefore, it is possible to prevent the contact surface between the shaft 20 and the journal bearing 30 from wearing due to the friction generated therebetween and to improve durability even when the double-headed swash type compressor 1 is used for a long time.

For reference, oil, which is introduced into or discharged from the pores formed in the journal bearing 30 according to a difference in pressure for each position between the shaft 20 and the journal bearing 30 when the shaft 20 rotates, is consistently circulated.

Figure 4C:
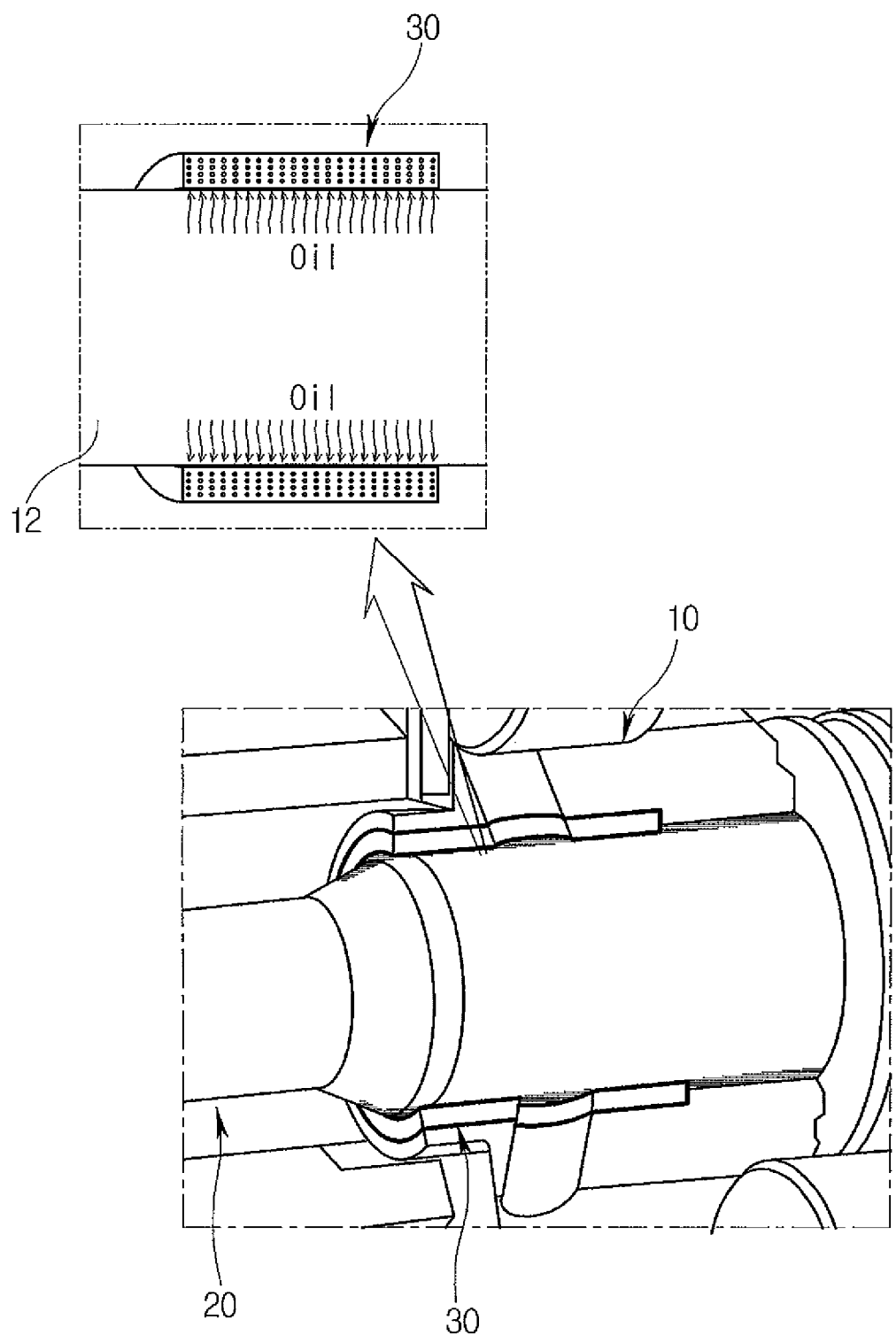
FIG. 4C is a schematic perspective enlarged view illustrating a state in which oil is introduced through the pores in the journal bearing when the double-headed swash type compressor is stopped, after the state of FIG. 4B.

Referring to FIG. 4C, when the shaft 20 rotates and then stops, oil contained in refrigerant is introduced into the pores formed in the journal bearing 30 by capillarity. When the shaft 20 rotates again, the oil is discharged from the pores formed in the journal bearing 30 due to frictional heat, and is supplied to the outer peripheral surface of the shaft 20 in order to lubricate the outer peripheral surface of the shaft 20.

The journal bearing 30 preferably has an air porosity of 7% for stable lubrication with the shaft 20, as described above. Alternatively, the journal bearing 30 may have one of air porosities of 5% to 20% of the overall volume thereof, but the present invention is not limited thereto.

Referring to FIG. 2 or 3, the refrigerant discharge holes 24 are disposed at front and rear positions spaced from the refrigerant introduction hole 23 which is disposed at one side of the center of the shaft 20 in the longitudinal direction thereof; and the journal bearing 30 is located in the state in which it is in surface contact with the outer peripheral surface of the shaft 20 formed with the refrigerant discharge holes 24. The journal bearing 30 is disposed at a position in which the refrigerant supply holes 13 are formed in the shaft bore in order to supply refrigerant to the piston bores 12 along the passage 22 formed in the shaft 20 from among the movement paths of refrigerant into the double-headed swash type compressor 1. Therefore, the refrigerant may be stably moved to the shaft 20, the journal bearing 30, and the piston bores 12.

In particular, the refrigerant introduction hole 23 is located at the substantially center of the shaft 20 in the longitudinal direction thereof; and the refrigerant discharge holes 24 for discharge of supplied refrigerant are spaced apart from the refrigerant introduction hole 23 by the substantially same distance. Accordingly, refrigerant and oil may be uniformly supplied to the respective pistons 6 disposed at both ends of the cylinder block 10. In addition, oil mixed in refrigerant is adhered to the inner wall surface of the shaft 20 when the refrigerant flows in the shaft 20, and is separated from the refrigerant.

If the distances between the respective refrigerant discharge holes 24 and the refrigerant introduction hole 23 differ from each other, the amount of oil mixed in refrigerant discharged from the refrigerant discharge holes 24 may be significantly varied. However, since the distances between the respective refrigerant discharge holes 24 and the refrigerant introduction hole 23 are substantially equal to each other in the embodiment, the amount of separation of oil may be uniform. Through such a structure, working fluids may be uniformly compressed in the cylinders 12 provided in the compressor 1. In addition, two journal bearings 30 disposed at both ends of the cylinder block 10 may have a uniform lubrication capability.

Oil is introduced into the cylinders 12 only when the refrigerant supply holes 13 overlap with the refrigerant discharge holes 24, and if not, the refrigerant discharge holes 24 face the inner surface of the journal bearing 30. In this case, the refrigerant and oil, which are previously supplied into the shaft 20, are discharged to the journal bearing 30 through the refrigerant discharge holes 24, along with the rotation of the shaft 20. A portion of the oil mixed in the discharged refrigerant is introduced into the pores formed in the journal bearing 30 or is applied to the journal bearing 30, and thus the lubrication capability of the journal bearing 30 may be increased.

Even in this process, since the distances between the respective refrigerant discharge holes 24 and the refrigerant introduction hole 23 are substantially equal to each other, the flow rate of oil supplied to the journal bearing 30 may be uniform. Thereby, it is possible to prevent the shaft 20 from having different lubrication capabilities at both ends thereof.

The journal bearing 30 has the through-holes 32 opened at positions corresponding to the refrigerant supply holes 13. The through-holes 32 are opened at positions corresponding to the refrigerant supply holes 13 at the center of the journal bearing 30. The through-holes 32 are formed to move refrigerant therethrough, and are processed in the state in which the cylinder block 10 is located on a separate jig (not shown).

Since the journal bearing 30 is made of a sintered alloy, as described above, the strength of the journal bearing 30 is stably maintained in itself. Accordingly, the generation of burrs can be reduced when the through-holes 32 are processed, and the inner and outer peripheral surfaces of the through-holes 32 may be smooth even after the through-holes 32 are processed. Therefore, it is possible to improve workability and processability by an operator and reduce defect rates.

The journal bearing 30 includes a solid lubricant, the solid lubricant selectively uses one of graphite, mica, talc, boric acid, zinc oxide, plumbic oxide, sulfur, molybden disulphide, polytetrafluoroethylene (PTFE), and hexagonal boric acid (hBN), or the combination thereof.

The lubrication between the journal bearing 30 and the shaft 20 may be stably realized using oil contained in refrigerant through the air porosity of the journal bearing 30. However, when the double-headed swash type compressor 1 is operated in the stopped state, one of the above solid lubricants is selectively used in order to more stably operate the double-headed swash type compressor 1. In this case, the lubrication between the journal bearing 30 and the shaft 20 can be stably realized, without using a separate lubricant, in the initial stage where the shaft 20 is not lubricated.

In particular, since both the shaft 20 and the journal bearing 30 include a solid lubricant in the embodiment, the lubrication between the journal bearing 30 and the shaft 20 may be stably realized for a certain time in an oil-free state. Accordingly, it is possible to prevent the damage of the journal bearing 30 due to wear and friction until oil contained in refrigerant is supplied to the journal bearing 30 through the pores thereof, and to thereby improve the lubrication capability of the journal bearing 30.

The double-headed swash type compressor includes the front and rear housings 2 and 3 which are mounted to the front and the rear of the cylinder block 10, and the compression unit 4 which compresses refrigerant depending on the rotation of the shaft 20. The compression unit 4 includes the swash plate 5 inserted into the shaft 20, and the pistons 6 reciprocating in the piston bores 12 depending on the rotation of the swash plate 5.

The swash plate 5 converts the rotational force of the shaft 20 into the reciprocating motion of the pistons 6. The swash plate 5 rotates along with the rotation of the shaft 20, and is obliquely disposed in one direction to the shaft 20, as illustrated in the drawings.

Hereinafter, a double-headed swash type compressor 1a according to a second embodiment of the present invention will be described with reference to the drawings.

Figure 5:
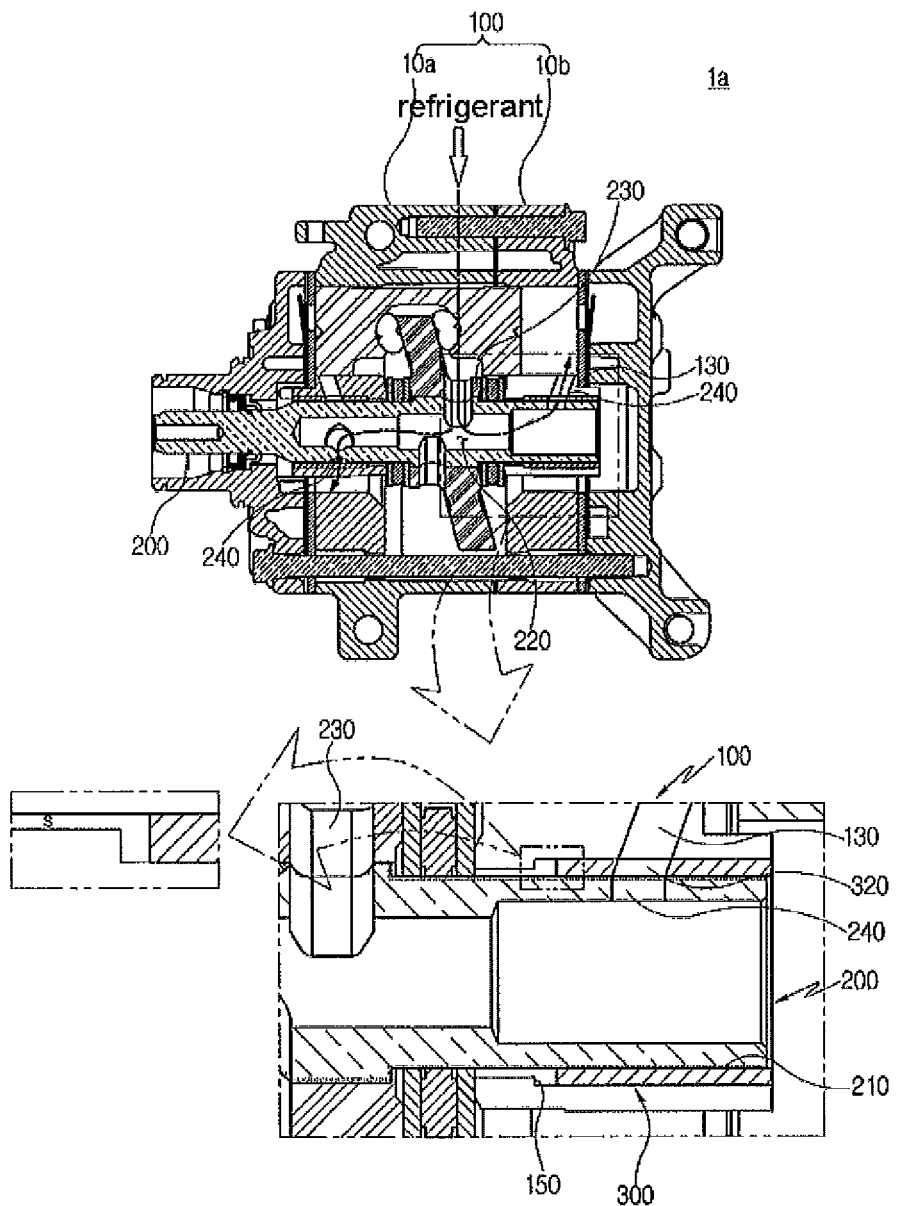
FIG. 5 is a cross-sectional view illustrating a double-headed swash type compressor according to a second embodiment of the present invention.
Figure 6:
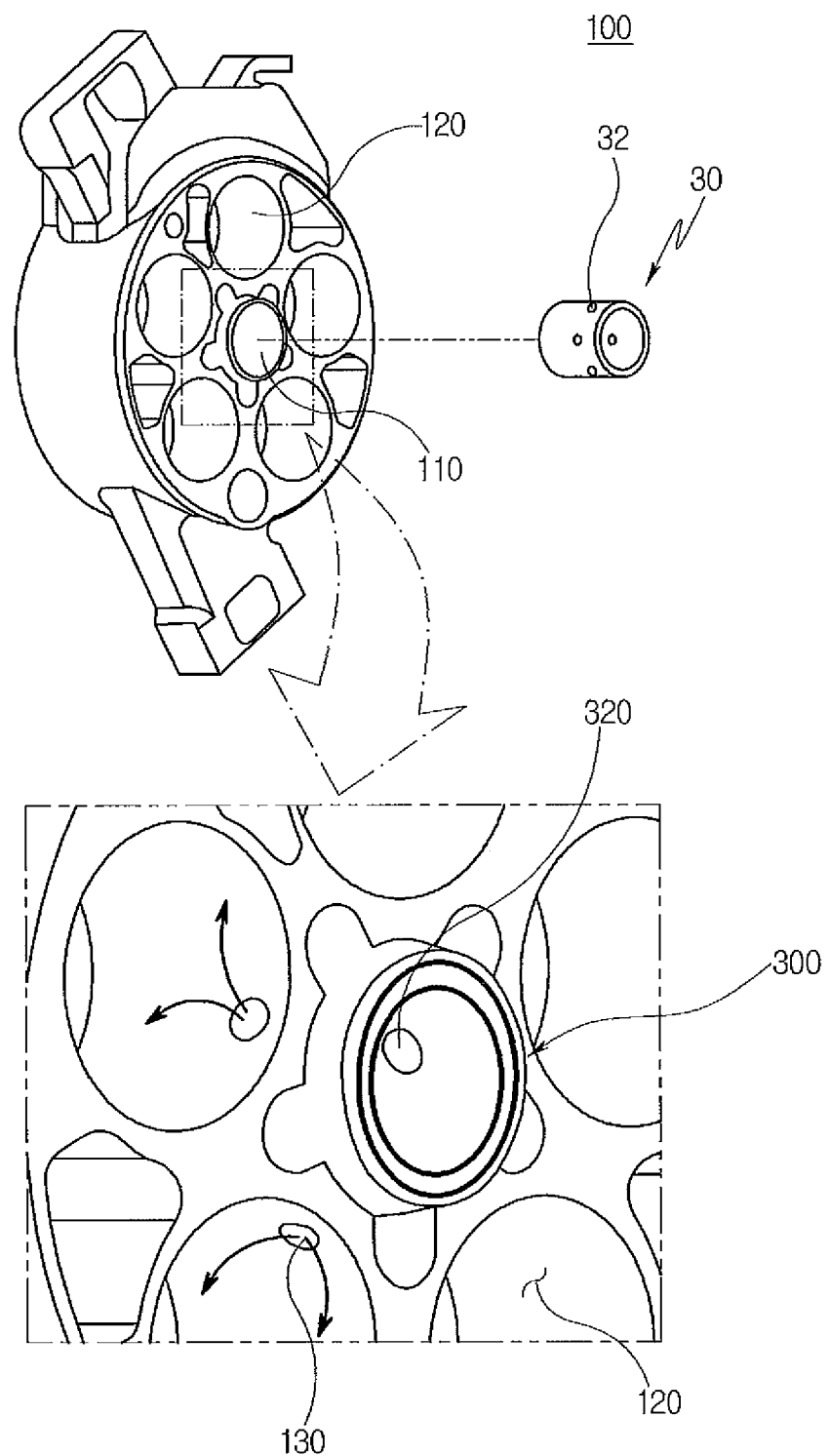
FIG. 6 is a exploded perspective view illustrating a state in which a journal bearing is inserted into a cylinder block, according to the second embodiment of the present invention.

Referring to FIGS. 5 and 6, the double-headed swash type compressor, which is designated by reference numeral 1a, according to the embodiment includes a cylinder block 100, front and rear housings 2 and 3, a shaft 200, a swash plate 5, and a journal bearing 300. The cylinder block 100 includes a plurality of piston bores 120 which are radially disposed, pistons 6 which reciprocate in the piston bores 120, and a cylindrical shaft bore 110 which is disposed between the piston bores 120. The front and rear housings 2 and 3 are respectively coupled to the front and the rear of the cylinder block 100 so as to define discharge chambers. The shaft 200 has a passage 220 which is formed therein so as to communicate with a suction space disposed between the discharge chambers, and refrigerant introduced into the suction space is moved to the piston bores 120. The swash plate 5 is obliquely installed to the shaft 200 and is connected to the pistons 6. The journal bearing 300 is disposed between the inner wall of the shaft bore 110 and the shaft 200 and is made of a sintered material. A space portion S is defined between the outer peripheral surface of the shaft 200 and the inner peripheral surface of the shaft bore 110, and the space portion S communicates with the suction space.

The configurations of the cylinder block 100 and the shaft 200 in the double-headed swash type compressor 1a according to the present embodiment are similar to those of the above-mentioned embodiment. The shaft 200 is stably lubricated through the space portion S to reduce the wear and damage thereof, and the durability thereof can be improved when the double-headed swash type compressor 1a is used for a long time.

To this end, the cylinder block 100 has a groove portion 140 which is relatively longer than the length of the journal bearing 300 for the insertion of the journal bearing 300. The space portion S extends to the groove portion 140.

The space portion S is a space defined between the outer peripheral surface of the shaft 200 and the inner peripheral surface of the shaft bore 110, and is spaced outward from the shaft 200 by a predetermined distance. Since oil contained in refrigerant introduced through the space portion S is moved to the groove portion 140, it is possible to stably lubricate the shaft 200 and prevent the wear of the shaft 200 during the rotation thereof.

In particular, the space portion S communicates with the suction space through which refrigerant to be compressed is introduced. The refrigerant introduced into the suction space contains oil, and the oil is separated from the refrigerant to be collected in the suction space. Since the space portion S communicates with the suction space in which a large amount of oil is present, the oil may be smoothly and sufficiently supplied to the space portion so as to be transferred to the groove portion 140. Therefore, the journal bearing 300 may be easily lubricated.

A step 150 is formed in the groove portion 140 so as to face and be spaced apart from one surface of the journal bearing 300, and a fluid introduced into the space portion S flows to the journal bearing 300 via the step 150. In this case, since oil remains in a space defined between the step 150 and the journal bearing 300, lubrication can be stably performed even when the shaft 200 rotates in the state in which the double-headed swash type compressor 1a is stopped. Therefore, the durability of the shaft 200 can be improved.

The journal bearing 300 has through-holes 320 opened at positions corresponding to refrigerant supply holes 130. The through-holes 320 are opened at positions corresponding to the refrigerant supply holes 130 at the center of the journal bearing 300. The through-holes 320 are formed to move refrigerant therethrough, and are processed in the state in which the cylinder block 100 is located on a separate jig (not shown).

Since the journal bearing 300 is made of a sintered alloy, the strength of the journal bearing 300 is stably maintained in itself. Accordingly, the generation of burrs may be reduced when the through-holes 320 are processed, and the inner and outer peripheral surfaces of the through-holes 320 may be smooth even after the through-holes 320 are processed. Therefore, it is possible to improve workability and processability by an operator and reduce defect rates.

Hereinafter, a double-headed swash type compressor 1b according to a third embodiment of the present invention will be described with reference to the drawings.

Figure 7:
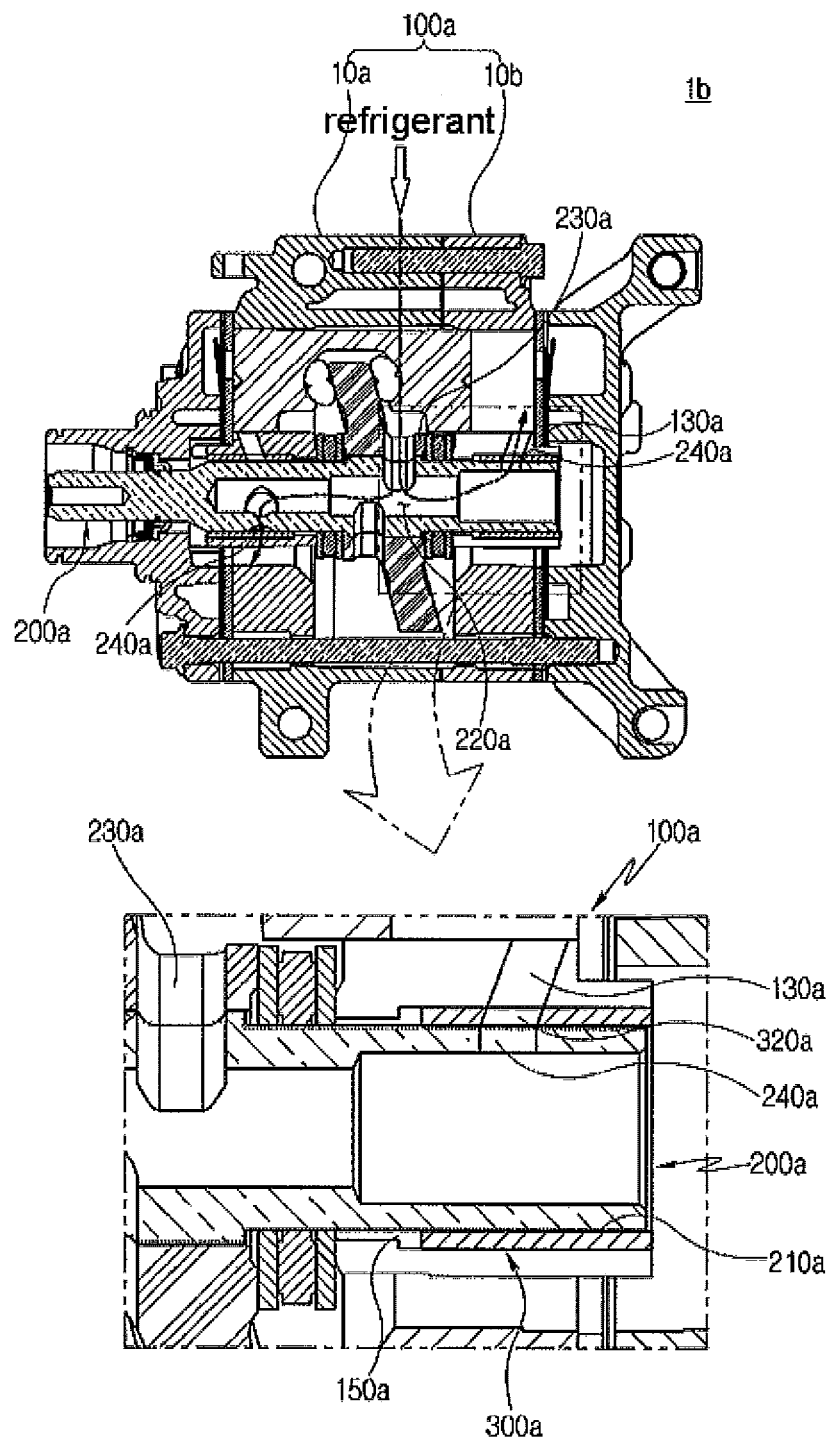
FIG. 7 is a cross-sectional view illustrating a double-headed swash type compressor according to a third embodiment of the present invention.
Figure 8:
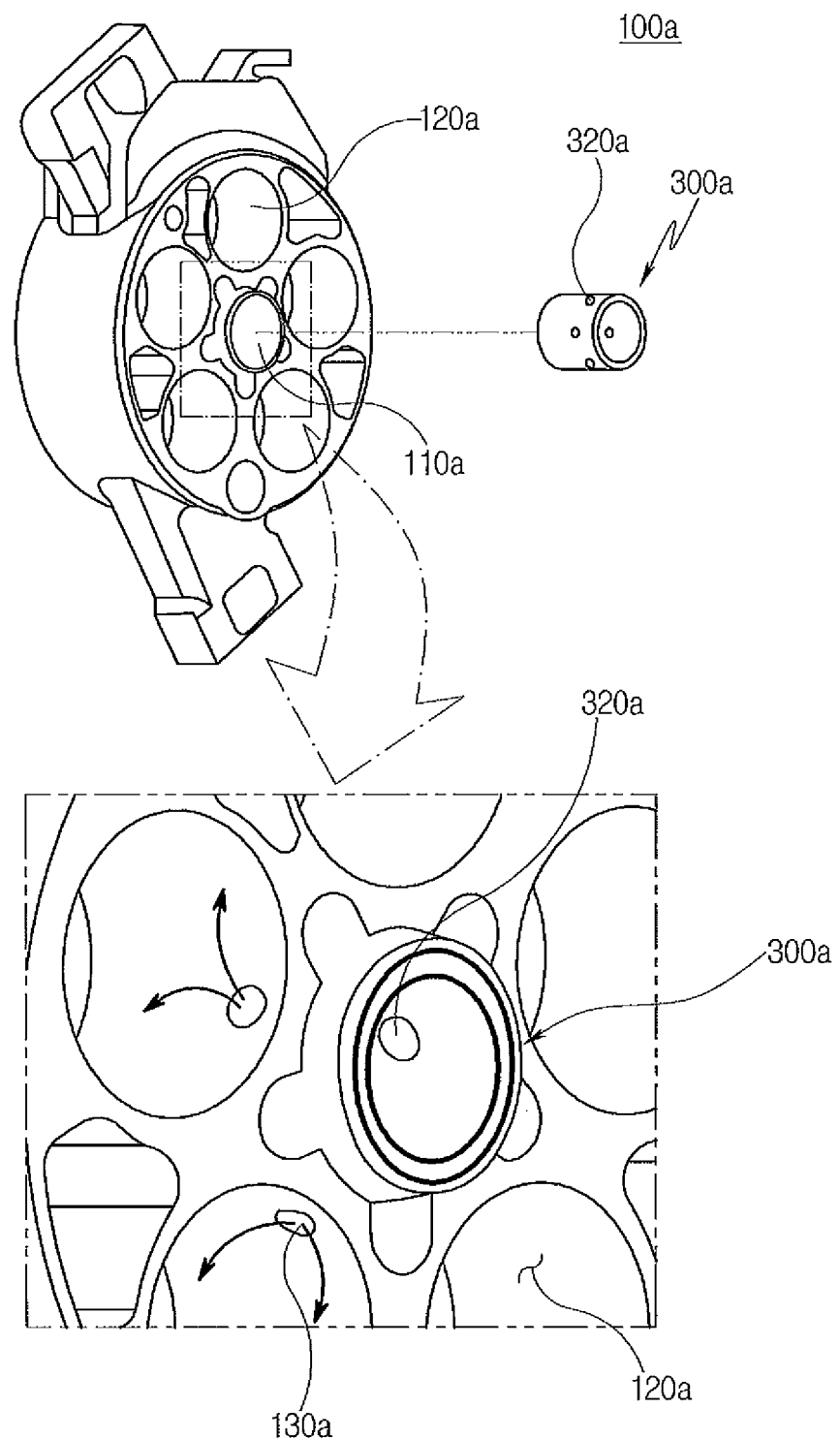
FIG. 8 is an exploded perspective view illustrating a state in which a journal bearing is inserted into a cylinder block, according to the third embodiment of the present invention.

Referring to FIGS. 7 and 8, the double-headed swash type compressor, which is designated by reference numeral 1b, according to the embodiment includes a cylinder block 100a, front and rear housings 2 and 3, a shaft 200a, a swash plate 5, and a journal bearing 300a. The cylinder block 100a includes a plurality of piston bores 120a which are radially disposed, pistons 6 which reciprocate in the piston bores 120a, and a cylindrical shaft bore 110a which is disposed between the piston bores 120a. The front and rear housings 2 and 3 are respectively coupled to the front and rear of the cylinder block 100a so as to define discharge chambers. The shaft 200a has a passage 220a which is formed therein so as to communicate with a suction space disposed between the discharge chambers, and refrigerant introduced into the suction space is transferred to the piston bores 120a. The swash plate 5 is obliquely installed to the shaft 200a and is connected to the pistons 6. The journal bearing 300a is disposed between the inner wall of the shaft bore 110a and the shaft 200a and is made of a material composed of 89% copper, 10% tin, and 1% graphite, and has an air porosity of at least 7% of the overall volume thereof.

The configurations of the cylinder block 100a and the shaft 200a in the double-headed swash type compressor 1b according to the present embodiment are similar to those of the above-mentioned embodiment. In the embodiment, the journal bearing 300a is made of a material composed of a specific ratio of copper, tin, and graphite, and has an air porosity of at least 7%, with the consequence that the journal bearing 300a may have a specific strength. Therefore, even when the friction between the shaft 200a and the journal bearing 300a is generated for a long time, the matters relating to the wear therebetween can be reduced and the lubrication therebetween can be stably realized.

Accordingly, since the wear and damage of the journal bearing 300a are prevented, it is possible to improve the lubrication capability of the journal bearing 300a for reducing friction and stably rotate the shaft 200a.

The journal bearing 300a has through-holes 320a opened at positions corresponding to refrigerant supply holes 130a. The through-holes 320a are opened at positions corresponding to the refrigerant supply holes 130a at the center of the journal bearing 300a. The through-holes 320a are formed to move refrigerant therethough, and are processed in the state in which the cylinder block 100a is located on a separate jig (not shown).

Since the journal bearing 300a is made of a sintered alloy, the strength of the journal bearing 300a is stably maintained in itself. Accordingly, the generation of burrs may be reduced when the through-holes 320a are processed, and the inner and outer peripheral surfaces of the through-holes 320a may be smooth even after the through-holes 320a are processed. Therefore, it is possible to improve workability and processability by an operator and reduce defect rates.

In a double-headed swash type compressor 1, 1a, 1b according to a fourth embodiment of the present invention, refrigerant is moved only when the positions of refrigerant discharge holes 24, 240, or 240a coincide with the positions of through-holes 32, 320, or 320a formed in journal bearing 30, 300, or 300a during the rotation of a shaft 20, 200, or 200a. Therefore, when the positions of the refrigerant discharge holes 24, 240, or 240a coincide with the positions of the through-holes 32, 320, or 320a according to the rotation speed of the shaft 20, 200, or 200a, a large amount of refrigerant is supplied to a plurality of piston bores 12, 120, or 120a.

The refrigerant discharge holes 24 and the through-holes 32 preferably have a similar or identical diameter in order to stably supply refrigerant. Through such a structure, the refrigerant may be simultaneously moved and compressed, and thus it is possible to simultaneously achieve an improvement in operating efficiency of the double-headed swash type compressor and stable movement of refrigerant.

Hereinafter, a method for manufacturing a cylinder block according to a fifth embodiment of the present invention will be described with reference to the drawings. In the present invention, a journal bearing, which is inserted into a cylinder block and the wear of which is generated due to the direct friction with a shaft, is manufacture in various manners, and is mounted in the cylinder block.

Figure 9:
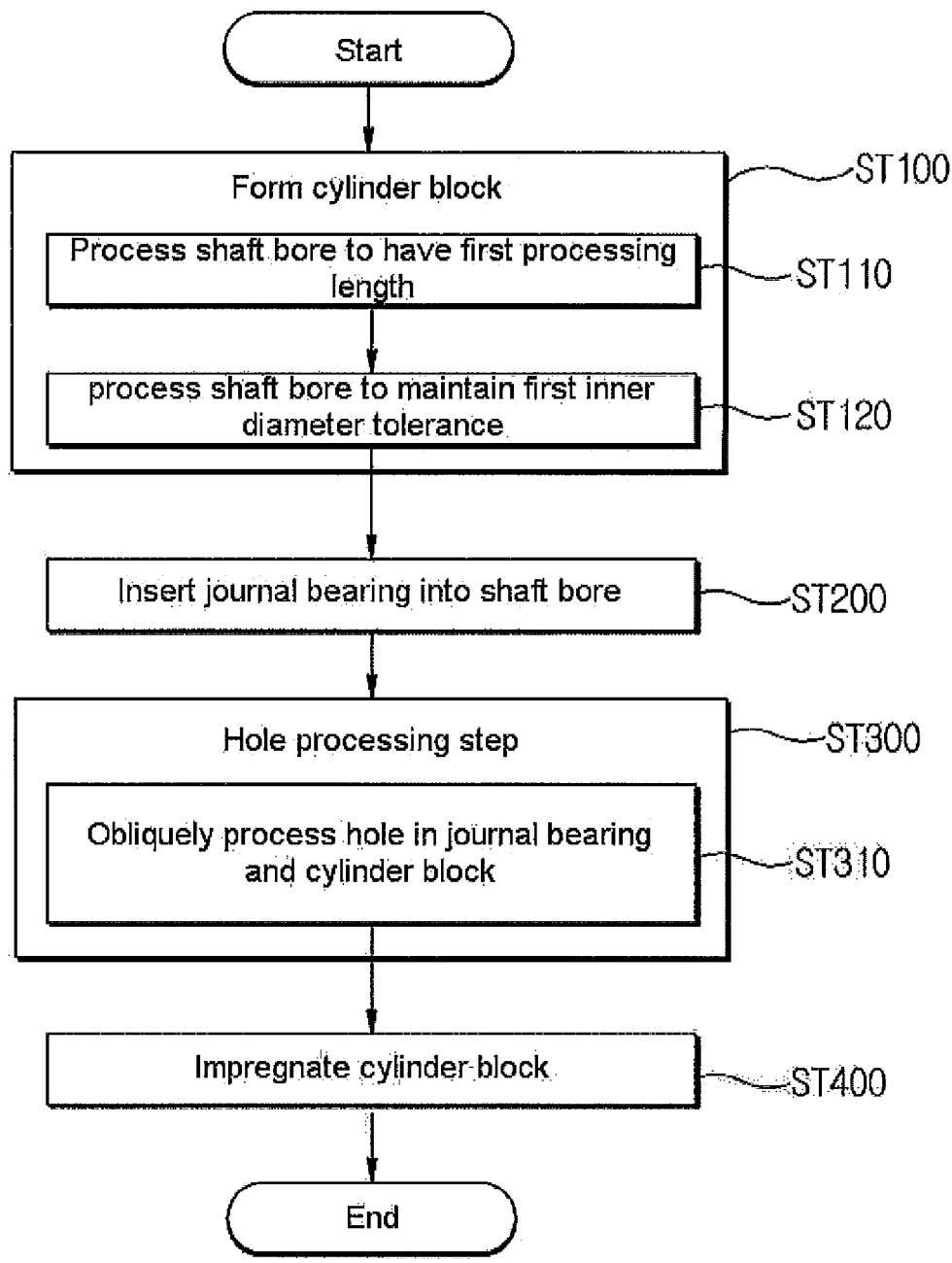
FIG. 9 is a flowchart illustrating a method for manufacturing a cylinder block according to another embodiment of the present invention.

Referring to FIG. 9, the method for manufacturing a cylinder block according to the embodiment includes a step (ST100) of forming a cylinder block which includes a plurality of piston bores radially disposed, pistons reciprocating in the piston bores, and a cylindrical shaft bore disposed between the piston bores, a step (ST200) of inserting a journal bearing made of a sintered material into each of both ends of the shaft bore, and a hole processing step (ST300) in which through-holes are formed in the journal bearing by processing holes in the state in which the journal bearing is inserted into the shaft bore while the shaft bore communicates with the piston bores in the cylinder block.

Since the cylinder block has a complicated shaft, the cylinder block is formed using die casting performed by pouring a molten metal into a pre-prepared mold.

After the cylinder block is formed through the die casting, the cylinder block is heat treated at a predetermined temperature in a chamber (not shown) in order to stabilize the crystalline structure thereof. A boring process is performed on the cylinder block in order to form the shaft bore into which a shaft is inserted.

For the boring process, after the cylinder block is located on a stationary jig, the shaft bore is processed so as to have a first processing length in the inward longitudinal direction thereof (ST110). The first processing length is formed so as to be relatively longer than the length of the journal bearing, thereby preventing the end of the journal bearing from being exposed to the outside of the cylinder block when the journal bearing is inserted into the shaft bore.

In this case, the first processing length is formed so as to be relatively longer than the length of the journal bearing, and numerically may be N mm or more.

In addition, the shaft bore is processed such that a first inner diameter tolerance is maintained between the outer diameter of the journal bearing and the inner diameter of the shaft bore (ST120), and the first inner diameter tolerance is in a range of ±0.01 mm. Accordingly, since the journal bearing is press-fitted into the shaft bore to be stably maintained, the inserted state of the journal bearing into the shaft bore is stably maintained regardless of the rotation of the shaft. Thus, the coupling characteristics of the journal bearing can be improved and the tolerance thereof can be accurately controlled. Therefore, the production of the cylinder block can be improved and the quality of product can be uniformly maintained.

The journal bearing is made of a sintered alloy. For example, the journal bearing is manufactured at a composition ratio of 89% copper, 10% tin, and 1%© graphite or 87% copper, 10% tin, and 3% graphite.

The journal bearing is manufactured by compression-molding metal powder composed of copper, tin, and graphite at high pressure of several tons or more, and then sintering the same at high temperature. When the journal bearing is formed by a manufacture method using a sintered alloy, the wear of the journal bearing due to direct friction with the shaft can be reduced and the tensile strength thereof can be improved. Therefore, even when the double-headed swash type compressor is used for a long time, the structural safety and strength of the journal bearing can be uniformly maintained.

The journal bearing has an air porosity of at least 7% of the overall volume thereof, and oil contained in refrigerant may be introduced or discharged through pores formed in the journal bearing. Accordingly, when frictional heat is generated due to the friction between the journal bearing and the shaft, an oil film is stably formed between the inner peripheral surface of the journal bearing and the outer peripheral surface of the shaft for stable lubrication therebetween. Therefore, the wear and damage of the journal bearing can be reduced even when the double-beaded swash type compressor is used for a long time.

In order to insert the journal bearing into the shaft bore (ST200), the journal bearing is press-fitted into the shaft bore through pressing in the state in which the journal bearing is partially inserted into the shaft bore. In this case, since the journal bearing is processed so as to have an outer diameter tolerance of ±0.01 mm, the press-fitted state of the journal bearing into the shaft bore is maintained. Therefore, even when the shaft is rotated at a specific rpm, the journal bearing is not separated from the shaft bore.

The holes are processed after the journal bearing is inserted into the shaft bore (ST300). Since the piston bores are circumferentially disposed around the shaft bore, the holes are processed so as to be inclined in the longitudinal direction of the journal bearing. In the hole processing step (ST300), the holes are processed at an angle of inclination of 70☐ or 65 to 75∞.

In addition, since the holes are simultaneously processed in the shaft bore and the piston bores when the through-holes are formed in the journal bearing, the holes for the movement of refrigerant are formed at one time, instead of being formed individually. Therefore, processability and workability can be improved and the dimension accuracy of the holes communicating with each other can be improved, thereby reducing the generation of foreign substances.

In addition, since the journal bearing is made of a sintered alloy, the above effects can be achieved, and the stable operation and durability of the double-headed swash type compressor can be improved.

After the cylinder block processed through such a manner is moved by a forklift or a separate transport means, the upper, lower, and side surfaces of the cylinder block are roughly processed. Subsequently, after front and rear cylinder blocks (not shown) are assembled to each other, the shaft bore and the piston bores are accurately processed.

After foreign substances are removed from the surface of the cylinder block by separate washing and drying processes, the surface of the cylinder block generated by die casting is impregnated (ST400).

The cylinder block is immersed in a reservoir filled with liquid resin (ST410) and is then taken out to the outside. In this case, since fine pores remaining on the surface of the cylinder block are filled with resin, refrigerant is prevented from flowing out or leaking.

Accordingly, even when the shaft is rotated for a long time and refrigerant is moved through the piston bores, the double-headed swash type compressor can be stably used.

In the embodiment, the journal bearing is made of a material composed of 89% copper, 10% tin, and 1% graphite, and has an air porosity of at least 7% of the overall volume thereof. Since the effects thereof have been described above, detailed description thereof will be omitted.

Hereinafter, the cylinder block and the pores formed in the cylinder block according to the present invention will be described with reference to the enlarged drawing.

Figure 10:
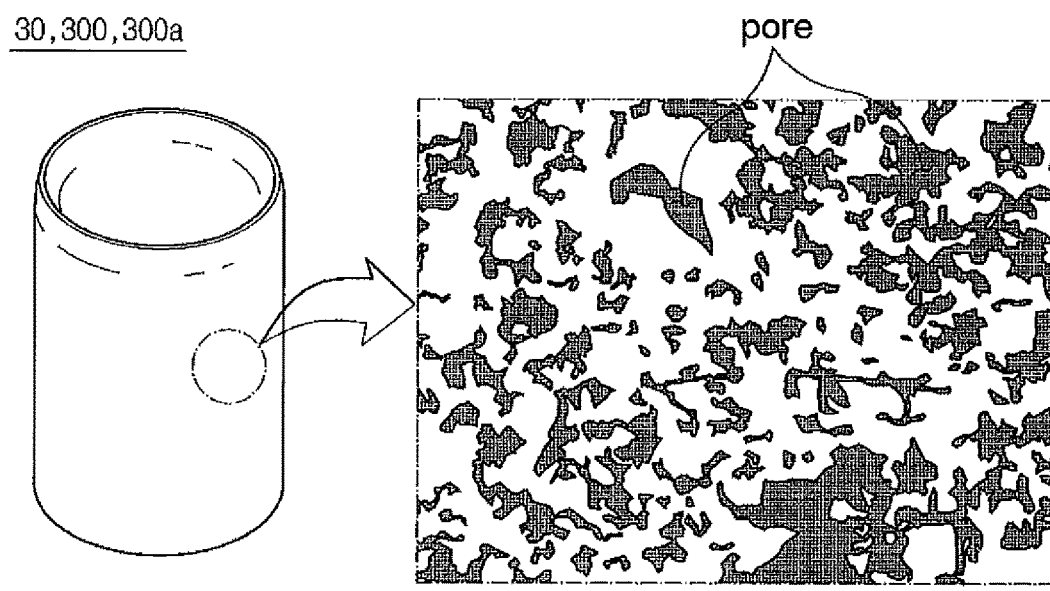
FIG. 10 is an enlarged fragmentary perspective view illustrating a cylinder block and pores formed in the cylinder block according to the present invention.

Referring to FIG. 10, when the journal bearing 30, 300, or 300*a* according to the embodiment is made of a sintered material, it may be seen that pores having unspecific sizes and shapes are distributed in the journal bearing 30, 300, 300*a* according to the result of checking the cross-section thereof using an electron microscope. Therefore, when oil contained in refrigerant remains in the pores or heat is transferred during the rotation of the shaft 20, 200, 200*a*, the oil may be discharged to the shaft 20, 200, 200*a* from the pores and thus the shaft 20, 200, 200*a* may be stably lubricated. Various embodiments have been described in the best mode for carrying out the invention.

INDUSTRIAL APPLICABILITY

The present invention may be applied to a double-headed swash type compressor equipped with a journal bearing.

Although the present invention has been described with respect to the illustrative embodiments, it will be apparent to those skilled in the art that various variations and modifications may be made without departing from the spirit and scope of the invention as defined in the following claims.

The invention claimed is:
1. A double-headed swash compressor comprising:
a cylinder block including an annular array of piston bores formed through the cylinder block, a plurality of pistons reciprocatingly received in the piston bores, a suction space formed in the cylinder block, and a shaft bore formed through the cylinder block, the shaft bore communicating with a plurality of refrigerant supply holes formed in the cylinder block, the plurality of refrigerant supply holes communicating with a plurality of compression chambers defined by the piston bores and the plurality of pistons;
a first housing coupled to a first side of the cylinder block;
a second housing coupled to a second side of the cylinder block;
a shaft received in the shaft bore, the shaft including a passage formed in the shaft configured to receive a refrigerant, a refrigerant introduction hole in fluid communication with the suction space and configured to introduce the refrigerant into the passage, and a refrigerant discharge hole configured to discharge the refrigerant from the passage;
a swash plate coupled to the shaft in an oblique position with respect to the shaft, the swash plate operatively coupled to the plurality of pistons; and
a journal bearing disposed between an inner peripheral surface of the shaft bore and an outer peripheral surface of the shaft, the journal bearing formed entirety from a porous sintered material, wherein the outer peripheral surface of the shaft is spaced apart from the inner peripheral surface of the shaft bore by a first distance (a) when the shaft is inserted into the shaft bore, and wherein oil contained in the refrigerant is introduced into or stored in a space defined by the distance (a) between the outer peripheral surface of the shaft and the inner peripheral surface of the shaft bore so that an oil film is formed on the shaft.

2. The double-headed swash compressor of claim 1, wherein the cylinder block includes a groove portion formed therein, the groove portion having a length greater than a length of the journal bearing and receiving the journal bearing therein.

3. The double-headed swash compressor of claim 2, wherein a step is formed in the groove portion spaced from the journal bearing.

4. The double-headed swash compressor of claim 1, wherein the journal bearing includes a plurality of through-holes formed therein, the plurality of through-holes aligned with the plurality of refrigerant supply holes, and wherein each of the plurality of through-holes and each of the plurality of refrigerant holes are formed obliquely with respect to the shaft bore.

5. The double-headed swash compressor of claim 1, further comprising a coating layer disposed intermediate the outer peripheral surface of the shaft and an inner surface of the journal bearing.

6. The double-headed swash compressor of claim 5, wherein the coating layer is a polytetrafluoroethylene (PTFE) coating.

7. The double-headed swash compressor of claim 1, wherein the journal bearing has an air porosity in a range of about 5% to 20% of a total volume of the journal bearing.

8. The double-headed swash compressor of claim 1, wherein the journal bearing has an air porosity of 7% of a total volume of the journal bearing.

9. The double-headed swash compressor of claim 1, wherein the journal bearing is formed from at least one of copper, tin, and graphite.

10. The double-headed swash compressor of claim 1, wherein the journal bearing is formed from a solid lubricant.

11. The double-headed swash compressor of claim 10, wherein the solid lubricant includes at least one of graphite, mica, talc, boric acid, zinc oxide, plumbic oxide, sulfur, molybden disulphide, polytestrafluoroethylene, and hexagonal boric acid.

12. The double-headed swash compressor of claim 1, wherein the journal bearing is formed from a material composed of 87% copper, 10% tin, and 3% graphite.

13. The double-headed swash compressor of claim 1, wherein the journal bearing is formed from a material composed of 89% copper, 10% tin, and 1% graphite.

14. The double-headed swash compressor of claim 1, wherein the suction space is disposed between a first discharge chamber formed in the first housing and a second discharge chamber formed in the second housing, and wherein the refrigerant introduction hole is formed between a first end of the shaft and a second end of the shaft.

15. A double-headed swash compressor comprising:
a cylinder block including an annular array of piston bores formed through the cylinder block, a plurality of pistons reciprocatingly received in the piston bores, a suction space formed in the cylinder block, and a shaft bore formed through the cylinder block, the shaft bore communicating with a plurality of refrigerant supply holes formed in the cylinder block, the plurality of refrigerant supply holes communicating with a plurality of compression chambers defined by the piston bores and the plurality of pistons;
a first housing coupled to a first side of the cylinder block, the first housing having a first discharge chamber formed therein;
a second housing coupled to a second side of the cylinder block, the second housing having a second discharge chamber formed therein, the suction space formed between the first discharge chamber and the second discharge chamber;
a shaft received in the shaft bore, the shaft including a passage in fluid communication with the suction space;
a swash plate coupled to the shaft in an oblique position with respect to the shaft, the swash plate operatively coupled to the plurality of pistons; and
a journal bearing disposed between an inner peripheral surface of the shaft bore and an outer peripheral surface of the shaft, the journal bearing formed entirely from a porous sintered material, wherein the outer peripheral surface of the shaft is spaced apart from the inner peripheral surface of the shaft bore by a first distance (a) when the shaft is inserted into the shaft bore, wherein oil contained in the refrigerant is introduced into or stored in a space defined by the distance (a) between the outer peripheral surface of the shaft and the inner peripheral surface of the shaft bore, the space in fluid communication with the suction space.

16. The double-headed swash compressor of claim 15, wherein the journal bearing is formed from a material composed of 89% copper, 10% tin, and 1% graphite.

17. The double-headed swash compressor of claim 15, wherein the cylinder block includes a groove portion formed therein, the groove portion having a length greater than a length of the journal bearing, the groove portion receiving the journal bearing therein, and wherein the space extends from the groove portion.

18. A method for manufacturing a cylinder block, comprising:
preparing a cylinder block, the cylinder block including an annular array of piston bores formed through the cylinder block, a plurality of pistons reciprocatingly received in the piston bores, and a shaft bore formed through the cylinder block;
inserting a journal bearing formed entirely of a porous sintered material into each of a first end of the shaft bore and a second end of the shaft bore;
inserting a shaft in the shaft bore, an outer peripheral surface of the shaft spaced apart from an inner peripheral surface of the shaft bore by a distance (a) when the shaft is inserted in the shaft bore; and
forming through-holes through the journal bearing, the through-holes in fluid communication with the piston bores when the journal bearing is inserted in each of the first end of the shaft bore and the second end of the shaft bore.

19. The method of claim 18, wherein the through-holes are formed at an angle in a range of about 65 degrees to 75 degrees with respect to an axial direction of the journal bearing.

20. The method of claim 18, further comprising the step of impregnating the cylinder block, the impregnating of the cylinder block including immersing the cylinder block in a reservoir of liquid resin for filling pores formed on the inner peripheral surface of the shaft bore.

* * * * *